United States Patent Office 3,403,950
Patented Oct. 1, 1968

3,403,950
BEARING ARRANGEMENT FOR THE ROLLS OF
A ROLLING MILL
Hans Siegfried Metzger, St. Ingbert-Saar, Germany, assignor to Verwaltungsgesellschaft Moeller & Neumann offene Handelsgesellschaft, St. Ingbert, Germany
Filed July 21, 1966, Ser. No. 566,887
Claims priority, application Germany, July 23, 1965, V 28,958
2 Claims. (Cl. 308—194)

ABSTRACT OF THE DISCLOSURE

A rolling mill including upper and lower rolls having end bearings positioned in openings provided in non-tilting upper and lower chocks, each bearing having an intermediate support member engageable with the bearing periphery and provided with an arcuate bearing surface slidably engageable with a complementary arcuate bearing surface on the chock with at least one of the bearing surfaces being provided with a coating of polytetrafluoroethylene to permit axial deflection of the rolls together and tilting of the bearings relative to the chock to reduce sliding friction.

---

Figure 1:
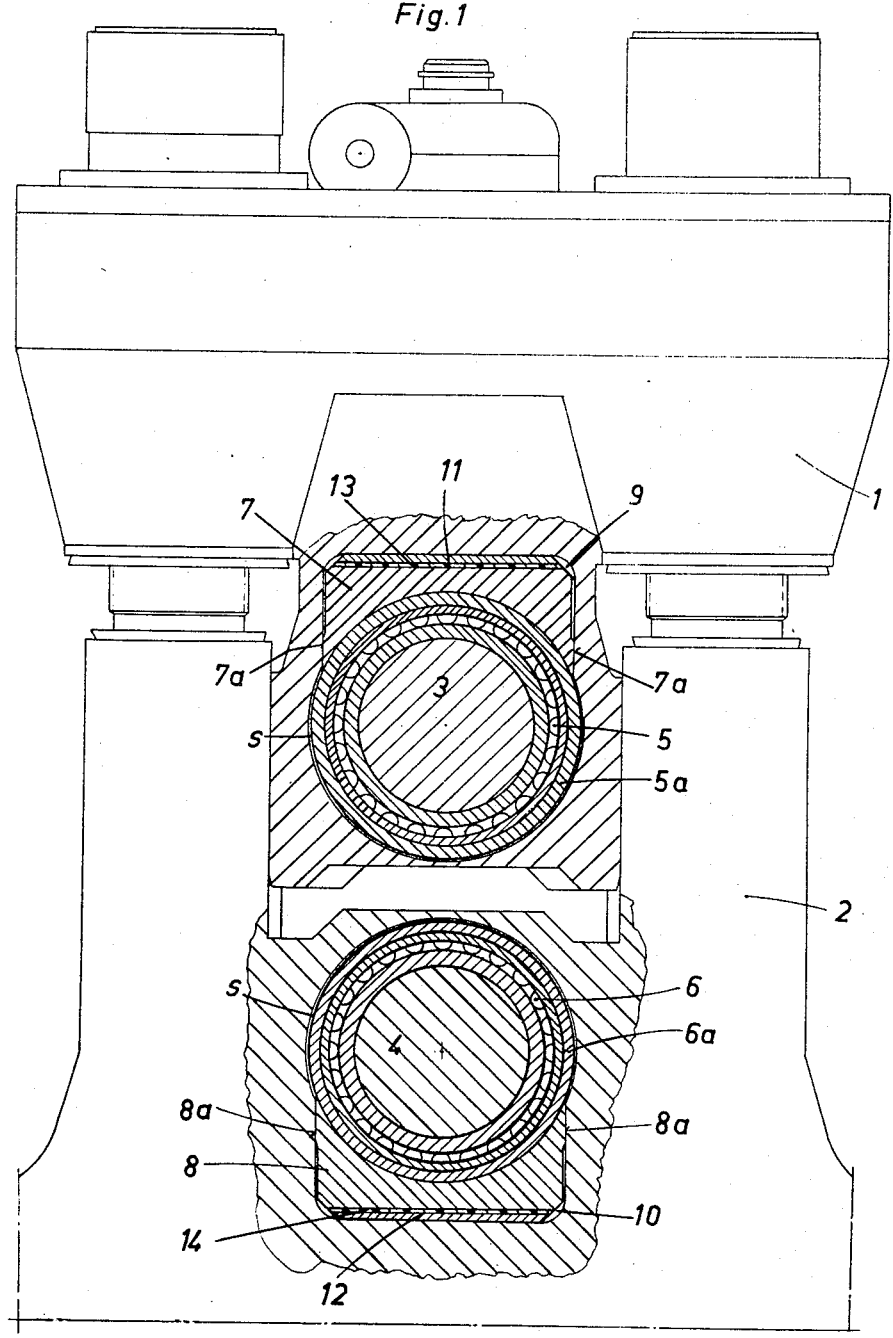

The invention relates to a bearing arrangement for the rolls of a rolling mill having multi-row antifriction bearings or slide bearings and a curved support cooperating with a complementary countersurface of the type employed in the art to prevent edge-pressures in the bearings during the deflection of the rolls. This problem is particularly serious in the case of multi-row antifriction bearings used in a frameless rolling mill because in this type of stands the stand parts which are placed under tension by stay bolts and which receive the bearings, are not movable in contrast to the normal chocks which are inserted into the windows of the conventional stands. Accordingly, it is necessary to provide self-aligning spherical roller bearings which do not permit such a high rolling speed as multi-row cylinder roller bearings. It is also known to support the bearing support of frameless stands at the stay bolts by means of spherical cap-shaped pressure elements in order to allow them to carry out a self-aligning movement during which the pressure surfaces are lubricated. However, the high rolling pressures prevent that continuous lubricating films are formed so that nevertheless a dry friction occurs at the pressure surfaces, thus destroying the desired mobility of the bearing supports for allowing it only while a countermovement is produced and leading to excessive edge-stresses of the bearings.

According to the invention the curved bearing support or/and the complementary countersurface is covered with a coating of a fluoric carbon resin, especially a polymerisation product of fluorinated ethylene-propylene. This work material, which is known under the trade name "Teflon," is distinctive in comparison with lubricated steel surfaces not because of a particularly favorable friction coefficient as far as its use with respect to machine elements is concerned, but in connection with bridge construction a concealed property of this material has been discovered in the sense that the friction coefficient of the movement decreases in a surprising manner from about 0.12 to 0.6 at high specific loads. This effect was determined in tests for novel types of bridge supports at a sliding speed of from 0.11 mm./s. and a load of 500 kg./cm.² providing a friction coefficient of 0.006.

The invention utilizes this result in the recognition that the forces in rolling mills are always so high that on the curved pressure surfaces which are to be coated according to the invention with a fluoric carbon resin a friction coefficient will be established which will be disproportionally lower than a person skilled in the special art of rolling mill constructions would expect.

Fluoric carbon resins have further the known property that a portion of the resin is worn off the coated bearing surfaces and adheres to the countersurface if the latter has a suitable surface formation. For this reason the invention provides that initially both contact surfaces are coated with fluoric carbon resin.

Figure 2:
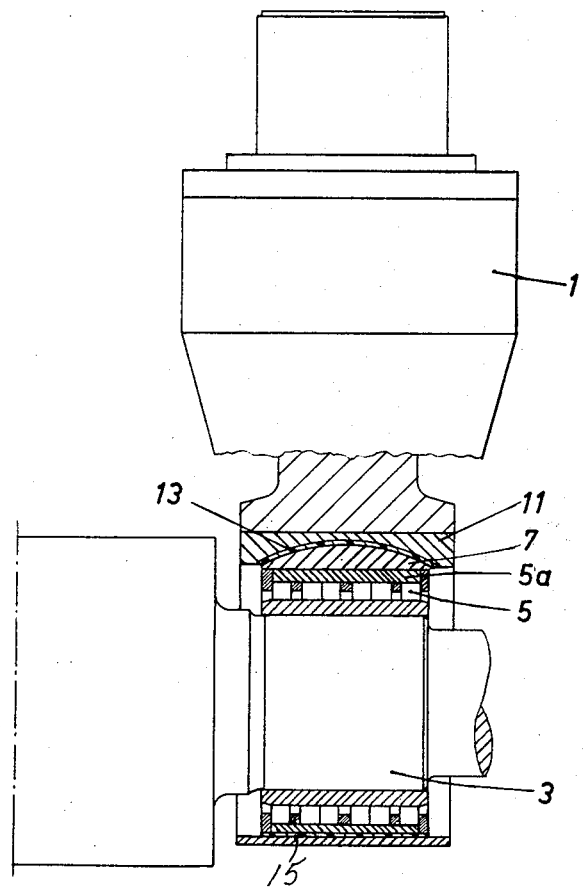

The objects and features of the invention will appear more clearly with reference to the accompanying drawings illustrating an embodiment of the bearing according to the invention for a pretensioned frameless rolling mill and in which:

FIGURE 1 is a side view of a rolling stand showing a section through the bearing arrangement of the rolls transversely of the roll necks, and FIGURE 2 is a longitudinal section through the bearing including the insert.

The rolling mill stand shown in the drawing has an upper part 1 and a lower part 2 in which the rolls are mounted at the roll necks 3, 4 in multi-row cylinder roller bearings 5, 6. The upper part 1 is not adapted to carry out any rocking movements relative to the lower part when the rolls are deflected under the rolling pressure.

In the case of a frameless rolling mill the present invention uses the known curved support mounting of the bearings on complementary shaped countersurfaces to provide a decrease of the edge-pressures in the roller bearings 5, 6 with the following construction:

A portion of the periphery of the roller bearing outer rings 5a, 6a bears under the rolling pressure exclusively on a first intermediate support piece 7, 8 which has been adapted to the outer diameter of the outer rings by suitable milling. These intermediate pieces are set into windows 9, 10 of the stationary stand parts 1, 2 or of the chocks in such a way that they are guided longitudinally to the rolls over the surfaces 7a, 8a in a close manner and may follow only the rocking movements of the roller bearings. The intermediate pieces 7, 8 have, as may be seen from FIGURE 2, support surfaces which are curved like a roll and which are supported on similarly curved countersurfaces of a complementary second intermediate pieces 11, 12. The two intermediate pieces are axially secured in a manner not shown in the drawings and have a flat contact with the windows 9, 10.

The curved support surfaces of the intermediate pieces 11, 12 are coated with a thin layer or coating 13, 14 of a fluoric carbon resin of about 0.02 mm. thickness, preferably a polymerisation product of ethylene-propylene, whose small friction coefficient assures in the case of high rolling pressures that the roller bearings 5, 6, together with the first intermediate pieces 7, 8 yield during deflection of the rolls whereby edge pressures in the bearings, especially excessive loads on the outer rows of bearing rolls, are eliminated.

The outer rings 5a, 6a of the cylinder roller bearings must be freely movable in the chocks on their remaining peripheral parts not in contact with the intermediate pieces 7, 8. In the embodiment shown this rocking movement is assured by the play S between the outer rings and the bores of the stand parts 1, 2, leading into the windows 9, 10.

The upper bearings 5 require devices for a weight balancing to prevent the upper roll from dropping down and pressing the outer rings 5a continuously against the intermediate pieces 7. This could also be obtained by crossing the gap S below the outer ring 5a by means of elastic inserts 5, for example a layer of synthetic material or a corrugated spring.

What is claimed is:
1. In a rolling mill including upper and lower rolls for processing work therebetween the combination which comprises, a bearing on each end of said upper and lower rolls, upper and lower chocks each having an opening for accommodating and surrounding each of said end bearings to support said rolls at each end, means for supporting said chocks on a fixed vertical axis, an intermediate support member guidably positioned within each of said chock openings and having an inner surface engageable with a portion of the outer periphery of said bearing, an outer arcuate bearing surface on said intermediate support members extending in the axial direction of said rolls, a complementary arcuate bearing surface on said chocks within said chock openings for sliding engagement with said support member bearing surface to permit axial deflection of said rolls together with said bearings and said support members relative to said chocks, a layer of polytetrafluoroethylene on at least one of said bearing surfaces on each end of said rolls for reducing the sliding friction between said bearing surfaces during the operation of said rolling mill and wherein the remaining portion of the outer periphery of said bearings and the adjacent inner wall of said chock openings define a clearance space for facilitating the axial tilting of said bearings in said chock openings.

2. A rolling mill in accordance with claim 1 including resilient means positioned within the clearance space of said upper chocks for yieldingly urging said upper bearings upwardly to balance said upper roll.

References Cited
UNITED STATES PATENTS

| | | | |
|---|---|---|---|
| 1,762,292 | 6/1930 | George | 72—244 |
| 2,123,754 | 7/1938 | Talbot | 308—194 XR |
| 2,345,321 | 3/1944 | Brown | 308—72 |
| 3,193,910 | 7/1965 | Evans | 308—72 XR |
| 3,197,842 | 8/1965 | Parker. | |
| 3,212,827 | 10/1965 | Brellrager. | |

FOREIGN PATENTS 485,867  10/1953  Italy.

MARTIN P. SCHWADRON, *Primary Examiner.*

FRANK SUSKO, *Assistant Examiner.*